Dec. 31, 1963  T. J. GUNNELL  3,116,114
CARBON BLACK PROCESS

Filed March 29, 1962  3 Sheets-Sheet 2

INVENTOR.
T.J. GUNNELL
BY *Young & Quigg*
ATTORNEYS

Dec. 31, 1963  T. J. GUNNELL  3,116,114
CARBON BLACK PROCESS

Filed March 29, 1962  3 Sheets-Sheet 3

INVENTOR.
T. J. GUNNELL
BY Young & Quigg
ATTORNEYS

United States Patent Office 3,116,114
Patented Dec. 31, 1963

3,116,114
CARBON BLACK PROCESS
Thomas J. Gunnell, Bartlesville, Okla., assignor to Phillips Petroleum Company, a corporation of Delaware
Filed Mar. 29, 1962, Ser. No. 183,453
9 Claims. (Cl. 23—209.4)

This invention relates to carbon black furnaces, to processes for operating the same, and to carbon black products produced thereby. In one aspect it relates to a carbon black furnace and process in which carbon black is formed by incomplete combustion of a hydrocarbon by a free oxygen-containing gas in a tube, while external heat is applied to the exterior of the tube, all without any products of combustion resulting from said external heating being added to the fluid inside the tube. In another aspect, it relates to a novel and useful carbon black product produced in such a furnace by such a process, which carbon black will impart valuable qualities to rubber mixtures containing the same.

In the prior art, the process of incomplete combustion of a hydrocarbon feedstock by a free oxygen-containing gas in a furnace to form carbon black has been additionally heated by merely adding more air, or by adding more fuel along with sufficient additional air to burn said added fuel, or by adding hot combustion gases, all being added directly to the carbon black-forming combustion in said furnace in said process. As a result, the percentage of the hydrocarbon feedstock converted to carbon black in the prior art was smaller than the percent converted in the present invention. Due to the combustion of more of said feedstock and fuel in the carbon black-making process of the prior art, in order to supply the necessary heat at about 2500° F. to convert the hydrocarbon to carbon black, a large amount of nascent carbon block was destroyed due to the presence of greater concentrations of carbon black-destroying gases in said furnace, such as carbon dioxide and water vapor, than are present in the present invention. All carbon black-forming chemical reactions are reversible and tend to be driven in an adverse direction by mass action if excessive quantities of carbon dioxide or water vapor are present. An excess of carbon dioxide under carbon black-forming conditions can attack the nascent carbon, forming carbon monoxide, and water vapor can attack the nascent carbon, forming hydrogen and carbon monoxide.

Some of the unexpected and valuable results of the present invention (over the prior art mentioned in the preceding paragraph in which additional combustion products enter the process) are that the present invention produces a greater yield not only in pounds/gallon of feedstock and also in percent of the total carbon available in the feedstock, but it also produces a greater percent of carbon black based on the carbon available in both the feedstock and the auxiliary fuel used in heating. The quality of the carbon black produced is improved. When it is compounded in rubber, it increases the rubber extrusion rating as to greater smoothness and more continuous uniformity when extruded in the Garvey Die test. The resilience of the rubber is increased and the $\Delta T$, ° F. heat build-up tendency of the rubber is decreased, as shown by all of the runs in the comparative data in the present application. While the data reported was obtained in a 2-inch diameter furnace, similar useful improvements are obtained in larger diameter furnaces, although furnaces as large as 1 foot in diameter show less improvement than the smaller furnaces as they tend to conserve heat.

The prior art also teaches pyrolizing hydrocarbons to carbon black by heating the same in a tube in the absence of any free oxygen-containing gas at all. This is regarded as nonanalogous art, as the thermal carbon blacks produced by these prior art pryolysis processes are so much inferior in rubber reinforcing properties to carbon black produced by incomplete combustion that the thermal carbon blacks are only used in ink or paint for their coloring properties, and are not regarded as suitable for use in rubber.

One object of the present invention is to provide a novel carbon black furnace in which an incomplete combustion carbon black-producing process may be heated by an external combustion of fuel without adding products of said external combustion to the process.

Another object is to provide a novel process of making carbon black by incomplete combustion while heating the process without adding additional products of combustion to the process.

Another object is to produce a novel composition of matter in greater yield consisting of carbon black which imparts better extrusion properties, greater resilience, and less heat build-up in rubber compounds containing the same.

Another object is to produce a furnace and a process for producing carbon black of superior qualities in greater yield than the prior art.

Numerous other objects and advantages will be apparent to those skilled in the art upon reading the accompanying specification, claims, and drawings.

Figure 1:
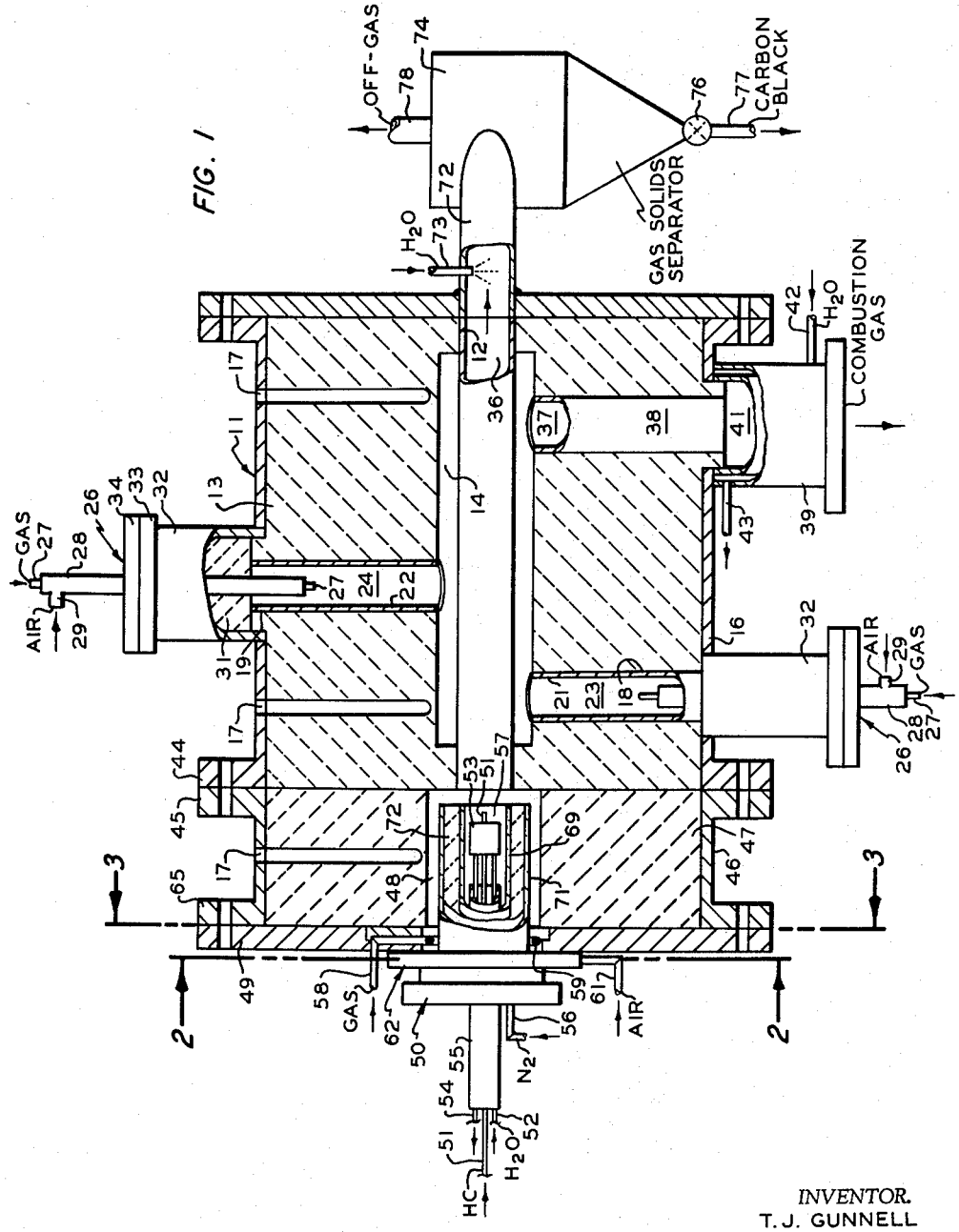
FIGURE 1 is an elevational cross-sectional view of a furnace embodying the present invention.

In FIGURE 1 a carbon black furnace generally designated as 11 is shown in section in order to disclose its internal construction. While this furnace could be built out of a number of materials and can vary widely in design and still successfully embody the present invention, the construction illustrated is a preferred embodiment of the furnace which was actually used in making runs Nos. 1–11 and obtaining the data reported in Tables I–III.

Essentially furnace 11 comprises a carbon black-forming reaction tube 12 made of a suitable ceramic material, silicon carbide being preferred. A large block of ceramic material 13 supports the end of tube 12 and has a hollow chamber surrounding the central portion of tube 12 so as to provide an annular heating chamber 14 around the exterior of tube 12 which does not communicate with the interior of tube 12 in any way. While otherwise unnecessary, it is preferred for structural strength to enclose the ceramic block 13 with a metal plate covering 16. If desired, thermometer wells 17 may be drilled through metal plates 16 and into ceramic material 13 to points adjacent, but preferably not in communication with, chamber 14 wherever desired, or thermometer wells 17 can be omitted entirely. A thermocouple may be lowered into each well 17 if desired in order to measure the temperature of the adjacent portion of the furnace.

A generally radial burner hole 18, or a plurality of such holes 18 and 19, are provided extending into communication with annular chamber 14 for the introduction of burning fluid fuel and air into said chamber 14. While not essential to the practice of the invention, it is believed more economical to line the burned holes 18 and 19 with ceramic tubes 21 and 22, respectively, preferably made of silicon carbide. In any event, whether tubes 21 and 22 are used or not, there are one or more burner chambers 23 and 24 in the heater holes 18 and 19 of the present construction. Extending into chamber 23 is a burner generally designated as 26 and a similar burner 26 extends into chamber 24 when said chamber is present. The burner 26 has a central pipe 27 for the introduction of fluid fuel, such as gas, and a surrounding tube 28, a free oxygen-containing gas such as air being supplied to the annulus between tubes 27 and 28 by means of conduit 29. A block of ceramic insulating material 31 may be provided inside the burner tube housing 32 surrounding the burner tube 28. The end of the housing may be provided with a flange 33 for connection with flange 34 of burner 26.

Figure 6:
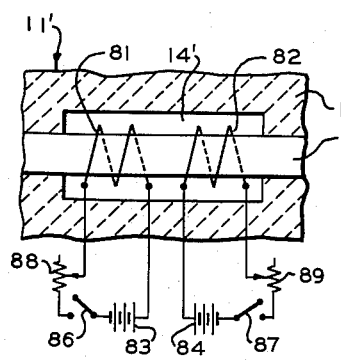
FIGURE 6 is a wiring diagram of a portion of a second species of furnace in which electrical resistance heating is substituted for external gas heating.

While gas burners 26 are preferred for reasons of economy, in situations where electricity is cheap enough electrical heating by resistance wires in chamber 14 can be substituted as shown in FIGURE 6 described below.

The burner 26 may be burning at the time it is inserted through insulation 31 into chamber 24, it being customary in such instances to provide flexible connections for pipes 27 and 29. Other expedients, such as dropping a burning oily rag down through chamber 24 before connecting flanges 33 and 34, will allow time for connection of gas and air supplies to pipes 27 and 29 before the rag is extinguished so that burner 26 may be thus ignited. Obviously, similar means for assembling and igniting a flame inside the reaction chamber, generally designated as 36, may be employed. If desired, the air and gas connections could be reversed in burner 26 with the air then coming in through the central pipe 27 and gas coming in through the annulus between pipes 27 and 28. However, it is preferred to have the gas come in the central pipe 27 in order to reduce any tendency for carbonaceous deposits on the walls of chambers 23 and 24.

Figure 2:
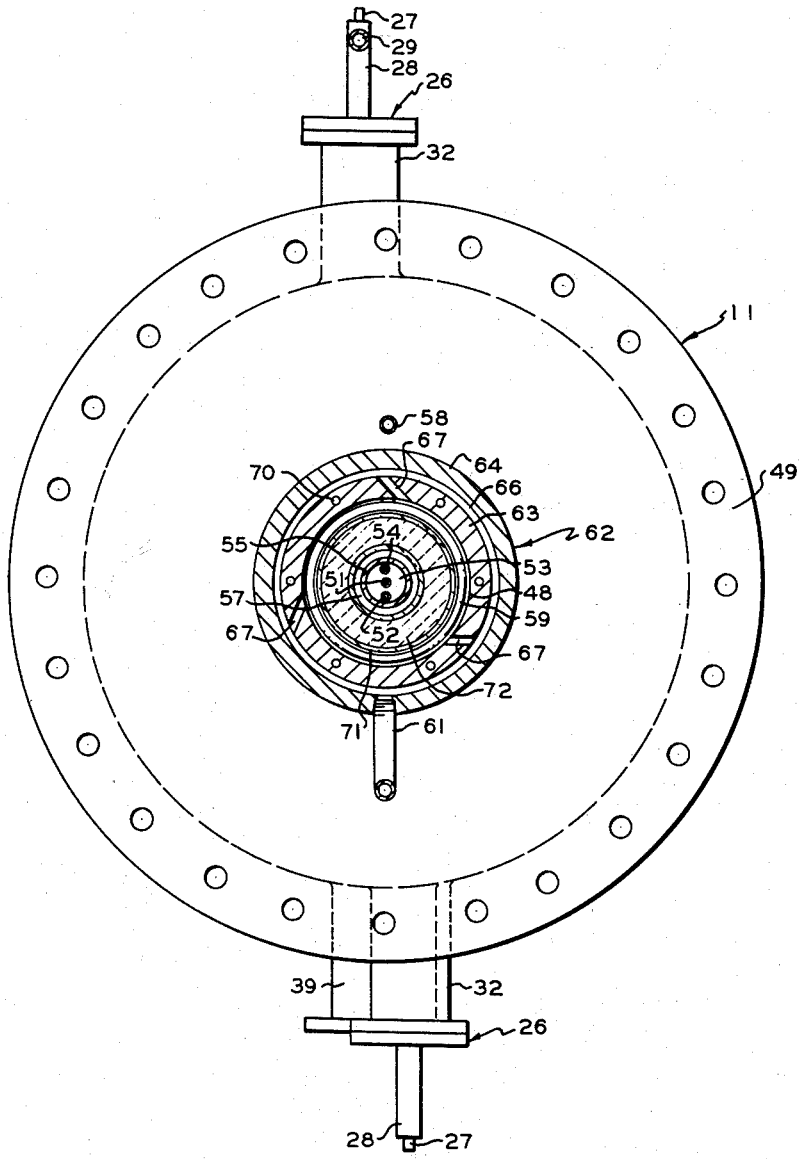
FIGURE 2 is a cross-sectional view of said furnace taken along the line 2—2 of FIGURE 1 looking in the direction indicated.

While chambers 23 and 24 will operate satisfactorily in the practice of the invention if disposed either radially or tangentially to the chamber 14, a more even flow of burning gases in chamber 14 is obtained by placing them in an intermediate position with the axes of housings 32 slightly offset from the diameter of chamber 14 as shown in FIGURE 2 to cause some helical circulation in chamber 14.

The combustion gases created by burning in the annular chamber 14 are allowed to escape from chamber 14 through a heating gas stack 37, which may be lined with a silicon carbide tube 38, if desired, in order to lengthen the life of the apparatus. If desired, a continuation of the stack 37 may be provided in the form of a metal water jacket 39 surrounding the stack chamber 41 and cooled by water being pumped in pipe 42 and passing through jacket 39 and out pipe 43. It is preferred to make furnace 11 in sections, which sections can be rapidly assembled and disassembled for maintenance and repair. Metal sleeve 16 is provided with a flange 44 to which flange 45 is secured by bolts (bolts not shown). Flange 45 is connected to tubular section 46 containing ceramic insulating material 47 providing a central axial chamber 48, into which an axial fluid hydrocarbon burner generally designated as 50 may be inserted. The insulation 47 is protected by metal end plate 49, which is secured to flange 65 of section 46.

Burner 50 comprises a central fluid hydrocarbon introducing tube 51 extending axially into the furnace chamber 48 and directed to pass hydrocarbon into chamber 36 of tubing 12. If desired, the temperature of the inlet tube 51 may be controlled by running cooling water in through tube 52, through jacket 53 and out tube 54; however, this cooling water often is not needed. A sleeve 55 is provided to seal the space between pipes 51, 52, 54 and 69. If desired, nitrogen gas under pressure may be injected through tube 56 into the space 57 surrounding jacket 53 and pipe 51 to prevent the formation of carbonaceous deposits on the end of tube 51. However, it is not necessary to the practive of this invention to introduce nitrogen at this point, as air or other gas inert to the carbon black-making reaction may be introduced through said tube 56. Furthermore, if it is desired to operate without any inert gas in tube 56, this may readily be done, as the only difficulty will then be that the furnace may have to be shut down after a relatively long period of time to remove carbonaceous deposits around tube 51.

Figure 4:
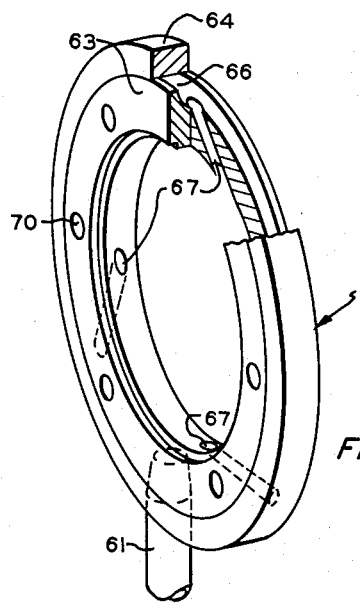
FIGURE 4 is a perspective view of the furnace air inlet ring with parts broken away to show details of construction.
Figure 5:
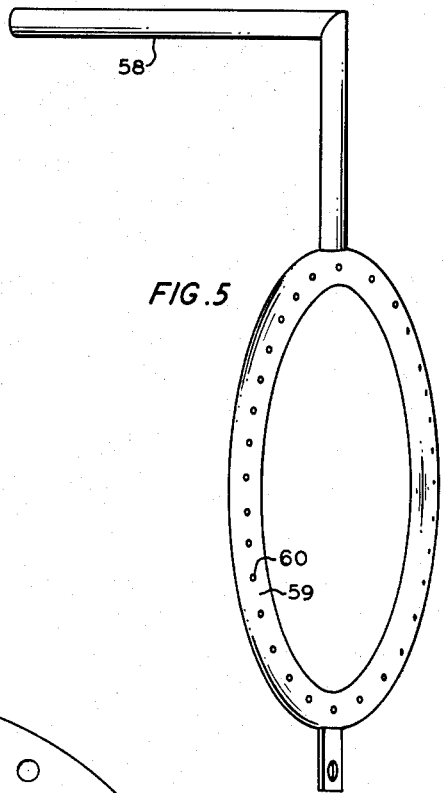
FIGURE 5 is a perspective view of the gas supply ring of the furnace.

In order to aid the incomplete combustion of the oil or other hydrocarbons coming axially out of tube 51 into chamber 36 in tube 12, it is sometimes preferred to supply a fluid fuel, such as gas, through tube 58 which is connected to a ring-type gas burner 59, which is better shown in FIGURE 5. Ring 59 distributes the gas around annulus 48. While the number of holes 60 in burner ring 59 is not critical, 32 are shown in FIGURE 5, and it is preferred to employ about 16 to 100 small spaced holes 60, for example 64 equally-spaced holes $\frac{1}{16}$ inch in diameter facing downstream. This construction provides a thorough mixing of the fluid fuel from ring 59 with air or other free oxygen-containing gas being furnished through pipe 61 through an air-distributing ring generally designated as 62, better shown in FIGURE 4.

It should be understood that the invention can be practiced with success without the addition of fluid fuel through tube 58 and ring 59, as the outer portion of the hydrocarbons introduced through tube 51 can be burned in the air from ring 62 to provide the incomplete combustion needed to pyrolize the inner portion of said hydrocarbons into carbon black.

In FIGURE 4 air-distributing ring 62 comprises an inner ring 63 and an outer ring 64 having an air-conducting channel 66 formed therebetween. The supply pipe 61 is connected in communication with the air-distributing channel 66 from whence it passes through generally tangential passages 67 in communication with annular space 48, the mixture of air from pipe 61 and gas from pipe 58 passing through annular space 48 and burning therein to create an annular sheath of hot combustion gases surrounding the fluid hydrocarbon from pipe 51 as they both pass into chamber 36 of tube 12. Holes 67 may be made radial, in which case there will not be any substantial whirling movement, or they can be made generally tangent to the inner surface of ring 63, in which case a helical motion of the air from openings 67 and the gas from openings 60 in burner 59 pass helically down space 48 and then pass spirally into chamber 36 of tube 12 surrounding the hydrocarbon 51 which is being forced axially into chamber 36. Bolt holes 70 in ring 63 are merely for bolts (not shown) to hold it in position by means of bolt holes 75 in plate 49 of FIGURE 3, and said holes 70 do not connect with either channel 66 or with holes 67.

While other construction may be employed, I prefer to form chamber 57 out of inner and outer silicon carbide tubes 69 and 71 with any suitable ceramic insulating material 72 filling the space between tubes 69 and 71, such as "Alundum #33–I" cast refractory insulation.

Figure 3:
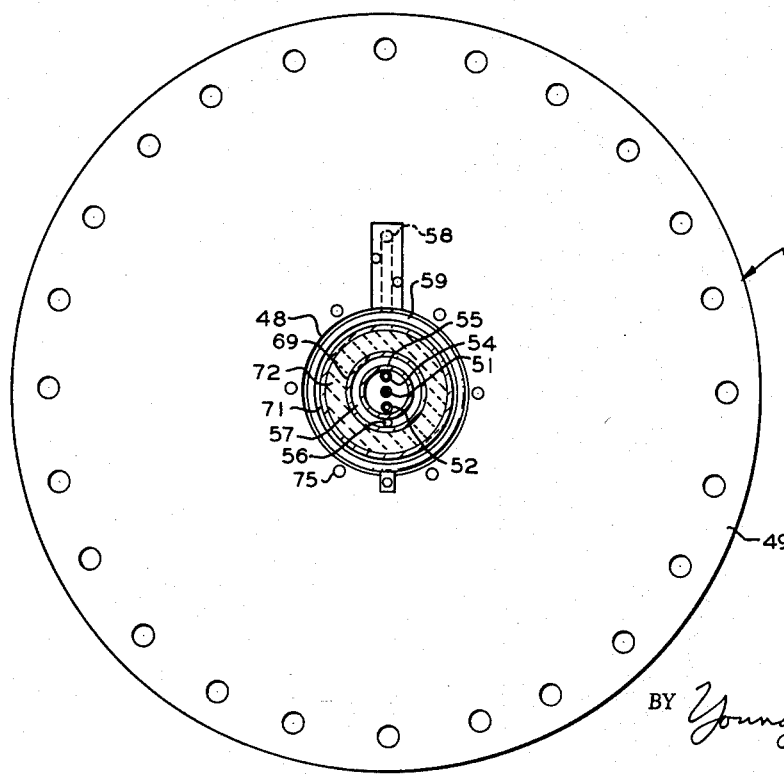
FIGURE 3 is another cross-sectional view of said furnace taken along the line 3—3 of FIGURE 1 looking in the direction indicated.

It is not believed necessary to give a list of all the types of insulation that will be available and useful in the invention. One very simple material is the mixture of 50 percent by weight Portland cement and 50 percent by weight asbestos fibers, which may be mixed together with sufficient water to render the cement plastic and then cast or molded into place. As FIGURES 4 and 5 have already been described and FIGURES 2 and 3 are cross sections of the device shown in FIGURE 1 looking in the direction indicated, further description of these figures is believed unnecessary, the corresponding parts being given corresponding numbers in these figures.

In the operation of this invention, the carbon black formed in reaction chamber 36 is substantially completely formed as it emerges as the solid particles of the effluent smoke leaving the right-hand end of tube 12 in FIGURE 1. However, if tube 12 discharged directly into the atmosphere at about 2500° F., the carbon black would burn up and also could not be collected. Therefore, any suitable cooling and collecting means known to the prior art may be employed. While indirect heat exchange with the atmosphere in tube 72 connected to tube 12 can be used in successfully practicing the invention, it is preferred to quench the effluent therein by direct cooling of an inert fluid coolant entering through pipe 73. While nitrogen gas could be employed, liquid water is preferred, entering as a water spray in pipe 72 cooling the same below about 1600° F., the amount of water being less than will evaporate and have a dew point above about 300° F. so that the carbon black will emerge from the gas-solids separator, shown as a conventional cyclone separator 74 through star valve 76 and pipe 77, as a dry powder while the gases and vapors pass out pipe 78 as off-gas. Instead of a cyclone, separator 74 may be a bag filter (not shown) or any combination gas-solids separation system well known in the prior art (not shown).

FIGURE 6 shows a portion of a second species of the present invention in which a furnace generally designated as 11' is identical to furnace 11 except that burner tubes 22 and 23 and gas burners 26 and flue 37 have been eliminated and electrical heating units substituted. One or, as shown, a plurality of helical electrical resistance wire heating coils 81 and 82 are wound around the tube 12' corresponding to tube 12 in the space 14' corresponding to space 14 in the insulation 13' corresponding to insulation 13 in FIGURE 1. Any known means to supply a regulated electrical current to the heating coils 81 and 82 may be employed, and for simplicity this electric power source is shown as batteries 83 and 84, switches 86 and 87, as rheostats 88 and 89, each set connected in series with the respective heating coil 81 and 82.

In the operation of the present invention, the heating produced by burning fuel in chamber 14 is in an amount sufficient to substantially increase the yield of carbon black in reaction chamber 36. As the combustion temperature in chamber 36 during carbon black production therein is preferably from 2000 to 3000° F. and generally is near 2500° F., it is preferred to maintain a temperature of from 1500 to 3500° F., and more preferably from 2000 to 3000° F. in the heating chamber 14. In many cases the optimum temperature in heating chamber 14 should be about the same as that inside reaction chamber 36, that is about 2500° F., so that the reaction in chamber 36 will be adiabatic in that no heat is being added or lost through the walls of the reaction tube 12, thus regulating and stabilizing the carbon black-forming reaction in reaction zone 36, increasing the carbon black yield, and improving and stabilizing the quality of carbon black produced as to its rubber compounding qualities discussed above and shown in the tables below.

The present invention provides means whereby the temperature conditions in the reactor can be controlled over an appreciable range while maintaining feed thereto at an optimum level. By providing a plurality of gas burners 26 or electrical heaters 81 and 82, which can be independently regulated, temperature gradients can be established, controlled or eliminated between points inside tubes 12 and 12' spaced along its longitudinal axis, or adiabatic conditions can be realized if desired. Uniform heating throughout the tube can be maintained or selected portions may be heated to the degree desired, or not heated if desired. The temperature of a selected portion or all of the exterior of tubes 12 or 12' may be maintained at a temperature above, equal to, or below that of the adjacent space inside said tube containing the carbon black-forming reaction, which reaction is not subjected to additions of foreign substances. As it has been found that each of these changes in heating mentioned in this paragraph has an effect on the quality and yield of the carbon black produced, it will be obvious that the present invention provides a novel and highly versatile method of control of quality and yield of carbon black, and an additional degree of freedom in the operation of a carbon black furnace.

EXAMPLES

The reactor used in the following runs was as shown in FIGURE 1. The reaction tube 12 was a 2-inch diameter "KT" silicon carbide tube 24 inches long embedded in insulating refractory 13 about 2 inches in length at each end. Process air and propane were introduced upstream of the reaction section in the ½-inch annulus formed by the 5-inch diameter inlet plug donut and the 6⅜-inch diameter combustion chamber. Air entered the upstream chamber with a swirling motion from 3 ports and mixed with the propane issuing from 64 jets 1/64 inch in diameter in the gas ring. At steady state conditions the resultant flame anchored on the plug about 2 inches downstream of the gas ring. For this series of runs the inlet plug was located ¾ inch upstream of the entrance to the reaction section.

Feed and combustion products were mixed by changes in velocity and direction. Vaporized feed hydrocarbon (benzene) was introduced along the axis of the reactor in a tube surrounded by a 1-inch diameter water-cooled tip. Diluent nitrogen was introduced around the tip to prevent carbon deposition on the relatively large cold wall.

As shown in Table I below, during runs Nos. 1–6, 10 and 11 embodying the present invention, the central 20 inches of pipe 12 was heated by burning 42 s.c.f./hr. of propane gas with 1380 s.c.f./hr. of air, one-half in each of burners 26, and thereby heating chamber 14 without the resulting combustion products entering the reaction chamber 36.

As a comparison, during runs Nos. 7, 8 and 9 there was no external heating in chamber 14 and burners 26 were not burning.

The amount of air entering pipe 61, of propane entering pipe 58, of benzene entering pipe 51, and of nitrogen entering pipe 56 are given in columns 2–5, respectively, in standard cubic feet per hour or pounds per hour; and the resulting photelometer reading of the carbon black produced, the yield of carbon black produced in lbs./gallon of benzene, in percent by weight of the process hydrocarbons (benzene from 51 and propane from 58 only), and in percent by weight of the total hydrocarbons from pipes 51, 58 and pipe 27, which includes the exterior fuel, are given in columns 6–9, respectively, of Table I for each of runs Nos. 1–11.

It will be noted in Table I that runs Nos. 5 and 6 are closest to run No. 7, while runs Nos. 8 and 9 are closest to run No. 10, so far as feed to the reaction zone is concerned. Note that runs Nos. 1–6 all produced a greater yield in the last column of more carbon black by weight percent of the total process hydrocarbons and fuel than run No. 7 produced by weight of the process hydrocarbons alone, and runs Nos. 10 and 11 had the same improvement over comparable runs Nos. 8 and 9. When only the benzene or the process hydrocarbons are compared in columns 7 or 8, the improvement in yield of the present invention in runs Nos. 1–6, 10 and 11 is even more marked over the prior art of runs Nos. 7–9.

The primary qualities of the carbon black produced in these same runs Nos. 1–11 were determined and are reported in Table II, and the qualities of rubber containing the carbon black of runs Nos. 1–11 are reported in Table III.

TABLE I
Furnace Operating Data

| Run No. | Feed to Reaction Zone | | | | Photelometer | Carbon Black Yield | | |
|---|---|---|---|---|---|---|---|---|
| | Air, s.c.f./hr. | Propane, s.c.f./hr. | Benzene, lb./hr. | $N_2$, s.c.f./hr. | | lb./gal. Benzene | Percent of Process HC | Percent of Process HC+Fuel |
| TUBE HEATED BY 1380 S.C.F./HR. AIR PLUS 42 S.C.F./HR. PROPANE | | | | | | | | |
| 1 | 880 | 23 | 6.7 | 31 | 87 | 3.8 | 40.0 | 27.6 |
| 2 | 820 | 23 | 7.2 | 31 | 80 | 3.0 | 32.5 | 23.0 |
| 3 | 890 | 28 | 5.8 | 31 | 98 | 2.0 | 19.6 | 13.0 |
| 4 | 1,320 | 41 | 9.7 | 31 | 83 | 2.8 | 28.7 | 22.0 |
| 5 | 1,350 | 41 | 6.6 | 31 | 100 | 1.9 | 17.2 | 12.0 |
| 6 | 1,360 | 41 | 10.7 | 31 | 93 | 2.8 | 30.4 | 23.6 |
| NO EXTERNAL HEAT ON THE TUBE | | | | | | | | |
| 7 | 1,360 | 41 | 6.4 | 31 | 94 | 1.3 | 11.9 | |
| 8 | 2,200 | 69 | 12.9 | 31 | 97 | 1.6 | 15.6 | |
| 9 | 2,200 | 69 | 14.1 | 31 | 94 | 1.8 | 17.8 | |
| TUBE HEATED BY 1380 S.C.F./HR. AIR PLUS 42 S.C.F./HR. PROPANE | | | | | | | | |
| 10 | 2,200 | 69 | 18.4 | 31 | 80 | 3.0 | 32.4 | 27.8 |
| 11 | 2,240 | 70 | 17.0 | 31 | 100 | 2.6 | 27.6 | 23.5 |

TABLE II
Carbon Black Properties

| Run No. | Sur. Area [a] (sq.m./gm.) | Oil Abs (cc./gm.) | pH | Benzene Ext. (wt. percent) | DPG Ads (Mic. Equiv.) | Michelin I (mg./gm.) | $NaBH_4$ Reduct (percent) | Volatiles (percent) | Ash (percent) | $H_2$ (percent) | $O_2$ (percent) |
|---|---|---|---|---|---|---|---|---|---|---|---|
| 1 | 102 | 1.23 | 8.5 | 0.4 | 16.3 | 183 | 0.011 | 1.9 | 0.0 | | |
| 2 | 97 | 1.17 | 8.9 | 0.6 | 11.4 | 150 | 0.012 | 2.1 | 0.02 | | |
| 3 | 107 | 1.33 | 8.7 | 0.3 | 10.1 | 185 | 0.012 | 2.5 | 0.02 | | |
| 4 | 117 | 1.35 | 7.9 | 0.3 | 10.1 | 202 | 0.017 | 1.9 | 0.0 | | |
| 5 | 218 | 1.36 | 8.8 | 0.3 | 16.7 | 434 | 0.017 | 3.2 | 0.3 | | |
| 6 | 109 | 1.31 | 8.8 | 0.4 | 10.8 | 234 | 0.012 | 2.1 | 0.1 | 0.35 | 0.77 |
| 7 | 166 | 1.45 | 8.9 | 0.3 | 17.2 | 387 | 0.016 | 2.4 | 0.0 | 0.26 | 2.0 |
| 8 | 218 | 1.48 | 9.1 | 0.5 | 18.9 | 375 | 0.008 | 2.9 | 0.2 | | |
| 9 | 176 | 1.43 | 8.9 | 0.6 | 16.5 | 435 | 0.015 | 2.5 | 0.2 | | |
| 10 | 120 | 1.37 | 7.0 | 0.3 | 12.3 | 232 | 0.006 | 2.3 | 0.02 | | |
| 11 | 144 | 1.35 | 7.8 | 0.0 | 13.2 | 267 | 0.010 | 2.1 | | | |

[a] By nitrogen adsorption.

TABLE III
Summary of Rubber Properties
30 MIN. CURE AT 307° F.

| Run No. | 1 | 2 | 3 | 4 | 5 | 6 | 7 | 8 | 9 | 10 | 11 |
|---|---|---|---|---|---|---|---|---|---|---|---|
| Mooney, MS 1½ at 212° F | 30 | 30 | 31 | 34.5 | 38 | 33 | 42.5 | 48 | 43.5 | 35 | 40.5 |
| Extrusion at 250° F.: | | | | | | | | | | | |
| in./min | 41.0 | 41.0 | 41.5 | 42.5 | 47 | 42.8 | 48.5 | 50.2 | 47.0 | 42.5 | 46.5 |
| gm./min | 110.0 | 112.5 | 112 | 114.5 | 119.0 | 117.5 | 124.0 | 126.0 | 117.5 | 112.0 | 119.0 |
| Rating, Garvey Die | 10− | 10+ | 10− | 11− | 10− | 10 | 10 | 9 | 11− | 10− |
| $\nu \times 10^4$, moles/cc | 1.52 | 1.47 | 1.49 | 1.53 | 1.42 | 1.53 | 1.54 | 1.57 | 1.53 | 1.54 | 1.58 |
| Comp. Set, Percent | 15.7 | 15.8 | 16.0 | 16.3 | 23.0 | 16.2 | 16.8 | 17.7 | 19.4 | 16.3 | 16.4 |
| 300% Modulus, p.s.i | 1,340 | 1,230 | 1,380 | 1,500 | 1,035 | 1,440 | 1,385 | 1,400 | 1,535 | 1,400 | 1,420 |
| Tensile, p.s.i | 3,520 | 3,320 | 3,390 | 3,790 | 4,130 | 3,640 | 3,900 | 4,230 | 3,400 | 4,075 | 3,795 |
| Elongation, Percent | 520 | 530 | 510 | 520 | 615 | 530 | 540 | 570 | 495 | 550 | 530 |
| Resilience, Percent | 58.1 | 57.8 | 56.8 | 55.7 | 53.4 | 56.3 | 53.3 | 51.0 | 53.1 | 54.5 | 53.5 |
| Δ T, ° F | 65.9 | 64.5 | 64.5 | 67.6 | 70.9 | 67.2 | 73.0 | 75.0 | 71.6 | 67.9 | 71.6 |
| Shore A Hardness | 63.5 | 63.5 | 64.5 | 64.0 | 64.0 | 64.5 | 67.5 | 67.5 | 67.5 | 62.5 | 66.0 |
| Abrasion Loss, g | 8.59 | 10.05 | 8.54 | 7.37 | | 8.0 | 6.70 | 7.10 | 7.03 | 7.05 | 6.55 |
| OVEN AGED 24 HRS. AT 212° F. | | | | | | | | | | | |
| 300% Modulus, p.s.i | 2,690 | 2,250 | 2,385 | 2,730 | 1,990 | 2,535 | 2,350 | 2,570 | 2,530 | 2,560 | 2,665 |
| Tensile, p.s.i | 3,505 | 2,900 | 3,320 | 3,740 | 4,350 | 3,125 | 3,210 | 4,120 | 3,890 | 3,650 | 4,115 |
| Elongation, Percent | 360 | 350 | 370 | 360 | 470 | 340 | 380 | 410 | 400 | 380 | 400 |
| Resilience, Percent | 64.1 | 64.4 | 63.5 | 61.9 | 58.8 | 61.8 | 58.3 | 56.9 | 57.5 | 61.4 | 59.0 |
| Δ T, ° F | 59.1 | 56.8 | 58.5 | 61.9 | 64.9 | 62.2 | 67.2 | 68.6 | 66.9 | 61.5 | 65.5 |
| Abrasion Loss, g | 8.52 | 9.85 | 8.24 | 7.57 | | 8.02 | 6.49 | 6.84 | 6.55 | 6.71 | 6.38 |

The rubber compound recipe used in each of runs Nos. 1–11 of Table III was as follows.

| Material: | Parts |
|---|---|
| Philprene 1000 | 100 |
| Carbon black | 40 |
| Zinc oxide | 3 |
| BRT #7 | 6 |
| Sulfur | 1.75 |
| Santocure | 0.9 |

All the above tests and materials used in Tables I to III are well known in the prior art. Photelometer of Table I was determined by the procedure of ASTM D1618–58T.

Philprene 1000 is a butadiene-styrene copolymer prepared by emulsion polymerization at 122° F. using a fatty acid soap emulsifier. It has a bound styrene content of 23.5 weight percent and a Mooney value (ML–4 at 212° F.) of 48.

BRT #7 is a refined coal tar product with a specific gravity of 1.20 to 1.25 and an Engler specific viscosity at 100° C. of 6–9 and is a plasticizer.

Santocure is a vulcanization accelerator and is N-cyclohexyl-2-benzothiazolesulfenamide.

The following short description of the tests in Tables II and III are sufficient for one skilled in the art:

Surface area was determined by the Brunauer, Emmett and Teller Theory (B.E.T. method) involving the low temperature adsorption of a mono-molecular layer of nitrogen.

Oil absorption is the volume of oil in cc. to convert a gram of carbon black to a stiuff paste ball as per ASTM D281–31.

The pH is that of a suspension of carbon black in water as per ASTM D1512–60.

Benzene extraction is the percent weight loss of 1.75 grams of carbon black after extraction of tar with hot benzene for 5 hours.

DPG adsorption is the number of microequivalents of diphenylguanidine absorbed by one gram of carbon black, determined by back titration of the benzene solution of the DPG with standard methanolic HCl using tetrabromophenylsulphonephthalein indicator.

Michelin iodine number is the mg. of iodine adsorbed by 1 gram of carbon black which has been primarily devolatilized by heating in the absence of air.

$NaBH_4$ reduction is the percent hydrogen uptake per gram of carbon black and is a measure of the quinone type surface groupings present.

Volatiles are the percent weight loss of dried samples of carbon black after 7 minutes at 950±20° C. in the absence of air.

Ash is the percent weight of residue left after heating the carbon black 16 hours at 550° C. in the presence of air.

The $H_2$ percent is the percent by weight of hydrogen contained in the carbon black after (1) it is swept with dry nitrogen for 1 hour at 150° C., and (2) then burned in dry oxygen. From the amount of water produced in the second step the amount of hydrogen present in the carbon black before burning is calculated.

The $O_2$ percent is the percent by weight of oxygen contained in the carbon black after step (1) of the preceding paragraph, obtained by then pyrolyzing the carbon black in a helium atmosphere, passing the effluent over heated carbon and measuring the carbon monoxide produced as an indication of the amount of oxygen present.

Mooney, MS 1½ at 212° F., was determined according to ASTM D927–57T with a Mooney viscometer, small rotor, 1.5 minutes at 212° F.

The four extrusion values were determined with a No. ½ Royle Extruder with Garvey Die as described in Industrial Engineering Chemistry, 34, 1309 (1942). The Garvey Die rating is based on smoothness and continuity of the extruded samples.

The compression set percent was determined according to ASTM D395–55, method B.

Modulus, tensile strength, and elongation were determined according to ASTM D412–51T.

Resilience was determined by Lupke rebound according to Vanderbilt Rubber Handbook, page 220 (1958).

ΔT, ° F. (heat build-up), was determined according to ASTM D623–58, method A.

Shore hardness was determined according to ASTM D676–58T.

Abrasion loss was measured with a modified Goodyear Huber Angle Abrader, 24-inch wheel, grade M, vitreous, grain size No. 36, Alundum of the Norton Company, Worcester, Massachusetts.

Benzene was chosen as the feedstock of runs No. 1–11 because it has a definite uniform chemical composition, $C_6H_6$, in the form of a single aromatic ring, known as the benzene ring. However, similar successful results in the practice of this invention are obtained using impure alkyl, alkylaromatic and aromatic hydrocarbons. This hydrocarbon feed may be any hydrocarbon from methane to heavy tar, although the best results are obtained with heavier hydrocarbons, especially those containing aromatic constituents.

In order to produce such small particle size grades of carbon black in high yield per pound of feedstock, it is preferable to employ a liquid hydrocarbon feedstock as the source of said carbon black. Said liquid hydrocarbon feedstock may be a petroleum distillate, or a petroleum residual oil, or a coal tar distillate, or a coal tar residual oil, it should have a substantial aromatic content, and may be fed in vapor form if substantially vaporizable, or as an atomized spray of droplets into the furnace. With regard to the use of petroleum oils, the following aromatic streams from an oil refinery are used commerically: (1) recycle gas oil from catalytic or thermal cracking; (2) synthetic tars from catalytic or thermal cracking; (3) cracked residues; and (4) vacuum still overhead streams and tarry residuums therefrom; or (5) aromatic streams recovered by solvent extraction of any of these streams (1) to (4).

From a standpoint of economics it is preferred to use liquid feedstocks having a U.S. Bureau of Mines correlation index (BMCI) of at least 80, preferably over 90 and more preferably over 110. The formula used is as follows:

$$BMCI = \left(\frac{876}{460+F} + \frac{670}{131.5+API} - 4.568\right)100$$

wherein "F" is the boiling point in ° F. at the 50 percent recovery distillation point and "API" is the American Petroleum Institute gravity at 60° F. Also from an economic standpoint the initial boiling point should be at least 170° F., preferably above 400° F. and most preferably above 550° F. It is preferred that the API gravity should be as low as possible, at least less than 25, preferably less than 10, most preferably 5 and below.

The best feedstock preferably has a low carbon residue and a low pentane insoluble content of less than 5 weight percent for petroleum oils and less than 10 weight percent for coal tars.

The oxygen and/or nitrogen content of the feedstock appears to only reduce the yield and not effect the quality. Sulfur is not objectionable in carbon black from a quality standpoint, but unusually large amounts in carbon black can cause corrosion in the carbon black-producing equipment. It is therefore desirable from a marketing standpoint to use a feedstock with a sulfur content of less than 3 weight percent, preferably less than 1 weight percent.

The ash content should be low, generally below 0.5 weight percent, preferably below 0.2 weight percent, in order to keep the refractory bricks in the carbon black furnace from fluxing, as the ash has little effect at all on the carbon black quality but tends to flux the refractory bricks of the furnace. The viscosity is unimportant except from a mechanical standpoint of difficulties of pumping and spraying.

Of course, virgin crude oil fractions, or aromatic-selective solvent extracts therefrom, can be employed when they have the preferred qualities discussed above, but generally they will be found somewhat lacking in some of these preferred qualities, so that while carbon black may be made from them, they are not preferred as feedstocks for carbon black manufacture.

As an example of one preferred residual feedstock, I may employ an atomized spray of a normally liquid hydrocarbon having a hydrogen-to-carbon atomic ratio below 1.5 and preferably in the range of 0.75 to 1.25; a mean molecular weight above 140 and preferably from 225 to 550; and API gravity less than 20 and preferably less than 10; a viscosity low enough to permit handling, but usually above 30 SUS at 210° F.; and a low Conradson carbon residue, which however may be in excess of 1.5 weight percent, or even in excess of 3 weight percent.

As an example of one preferred distillate feedstock, I may employ a recycle gas oil derived from a cracking process and having an API gravity of 16 to 25, an initial boiling point of 400 to 600° F. and an end point of from 600 to 800° F. The carbon residue is generally low, such as 0.21 for example, although the carbon residue is not critical.

While a specific embodiment has been shown in the drawings and described in the specification for purposes of illustration, the invention obviously is not limited thereto.

Having described my invention, I claim:

1. A process for making furnace carbon black comprising the steps of injecting a hydrocarbon fluid axially into one end of a generally cylindrical reaction zone, injecting a first annular blanket of inert gas at said end around said injected hydrocarbon to reduce carbonaceous deposits in said zone, introducing a second annular blanket of gas containing sufficient free oxygen and a fluid fuel to maintain combustion in said reaction zone at said end around said injected hydrocarbon and said annular blanket of inert gas, maintaining combustion in said reaction zone whereby some of said injected hydrocarbon is converted by said combustion into carbon black, heating the exterior of said zone an amount sufficient to substantially increase the yield of carbon black by burning a second fluid fuel adjacent the same without introducing the additional products of combustion from said second fuel into said reaction zone, flowing the resulting gases and carbon black from the other end of said reaction zone, and separating said carbon black therefrom.

2. A process of making furnace carbon black comprising the steps of injecting a hydrocarbon fluid axially into one end of a generally cylindrical reaction zone, introducing an annular blanket of gas containing sufficient free oxygen and a fluid fuel to maintain combustion in said reaction zone at said end around said injected hydrocarbon, maintaining combustion in said reaction zone whereby some of said injected hydrocarbon is converted by said combustion into carbon black, heating the exterior of said zone an amount sufficient to substantially increase the yield of carbon black by burning a second fluid fuel adjacent the same without introducing the additional products of combustion from said second fuel into said reaction zone, flowing the resulting gases and carbon black from the other end of said reaction zone, and separating said carbon black therefrom.

3. A process of making furnace carbon black comprising the steps of injecting a hydrocarbon fluid axially into one end of a generally cylindrical reaction zone, injecting a first annular blanket of inert gas at said end around said injected hydrocarbon to reduce carbonaceous deposits in said zone, introducing a second annular blanket of gas containing sufficient free oxygen and a fluid fuel to maintain combustion in said reaction zone at said end around said injected hydrocarbon and said annular blanket of inert gas, maintaining combustion in said reaction zone whereby some of said injected hydrocarbon is converted by said combustion into carbon black, heating the exterior of said zone an amount sufficient to substantially increase the yield of carbon black without introducing additional products of combustion into said reaction zone, flowing the resulting gases and carbon black from the other end of said reaction zone, and separating said carbon black therefrom.

4. A process of making furnace carbon black comprising the steps of injecting a hydrocarbon fluid axially into one end of a generally cylindrical reaction zone, injecting a first annular blanket of inert gas at said end around said injected hydrocarbon to reduce carbonaceous deposits in said zone, introducing a second annular blanket of gas containing sufficient free oxygen to maintain combustion in said reaction zone at said end around said injected hydrocarbon and said annular blanket of inert gas, maintaining combustion in said reaction zone whereby some of said injected hydrocarbon is converted by said combustion into carbon black, heating the exterior of said zone an amount sufficient to substantially increase the yield of carbon black by burning a second fluid fuel adjacent the same without introducing the additional products of combustion from said second fuel into said reaction zone, flowing the resulting gases and carbon black from the other end of said reaction zone, and separating said carbon black therefrom.

5. A process of making furnace carbon black comprising the steps of injecting a hydrocarbon fluid axially into one end of a generally cylindrical reaction zone, introducing an annular blanket of gas containing sufficient free oxygen and a fluid fuel to maintain combustion in said reaction zone at said end around said injected hydrocarbon, maintaining combustion in said reaction zone whereby some of said injected hydrocarbon is converted by said combustion into carbon black, heating the exterior of said zone an amount sufficient to substantially increase the yield of carbon black without introducing additional products of combustion into said reaction zone, flowing the resulting gases and carbon black from the other end of said reaction zone, and separating said carbon black therefrom.

6. A process of making furnace carbon black comprising the steps of injecting a hydrocarbon fluid axially into one end of a generally cylindrical reaction zone, introducing an annular blanket of gas containing sufficient free oxygen to maintain combustion in said reaction zone at said end around said injected hydrocarbon, maintaining combustion in said reaction zone whereby some of said injected hydrocarbon is converted by said combustion into carbon black, heating the exterior of said zone an amount sufficient to substantially increase the yield of carbon black by burning a second fluid fuel adjacent the same without introducing the additional products of combustion from said second fuel into said reaction zone, flowing the resulting gases and carbon black from the other end of said reaction zone, and separating said carbon black therefrom.

7. A process of making furnace carbon black comprising the steps of injecting a hydrocarbon fluid axially into one end of a generally cylindrical reaction zone, injecting a first annular blanket of gas at said end around said injected hydrocarbon to reduce carbonaceous deposits in said zone, introducing a second annular blanket of gas containing sufficient free oxygen to maintain combustion in said reaction zone at said end around said injected hydrocarbon and said annular blanket of inert gas, maintaining combustion in said reaction zone whereby some of said injected hydrocarbon is converted by said combustion into carbon black, heating the exterior of said zone an amount sufficient to substantially increase the yield of carbon black without introducing additional products of combustion into said reaction zone, flowing the resulting gases and carbon black from the other end of said reaction zone, and separating said carbon black therefrom.

8. A process of making furnace carbon black comprising the steps of injecting a hydrocarbon fluid axially into one end of a generally cylindrical reaction zone, introducing an annular blanket of gas containing sufficient free oxygen to maintain combustion in said reaction zone at said end around said injected hydrocarbon, maintaining combustion in said reaction zone whereby some of said injected hydrocarbon is converted by said combustion into carbon black, electrically heating the exterior of said zone an amount sufficient to substantially increase the yield of carbon black without introducing additional products of combustion into said reaction zone, flowing the resulting gases and carbon black from the other end of said reaction zone, and separating said carbon black therefrom.

9. A process of making furnace carbon black comprising the steps of injecting a hydrocarbon fluid axially into one end of a generally cylindrical reaction zone, introducing an annular blanket of gas containing sufficient free oxygen to maintain combustion in said reaction zone at said end around said injected hydrocarbon, maintaining combustion in said reaction zone whereby some of said injected hydrocarbon is converted by said combustion into carbon black, heating the exterior of said zone an amount sufficient to substantially increase the yield of carbon black without introducing additional products of combustion into said reaction zone, flowing the resulting gases and carbon black from the other end of said reaction zone, and separating said carbon black therefrom.

References Cited in the file of this patent

UNITED STATES PATENTS

| | | |
|---|---|---|
| 986,489 | Morehead | Mar. 14, 1911 |
| 1,220,391 | Bacon et al. | Mar. 27, 1917 |
| 2,062,358 | Frolich | Dec. 1, 1936 |
| 2,512,587 | Stengel | June 20, 1950 |
| 2,915,371 | Sweitzer | Dec. 1, 1959 |
| 3,009,784 | Krejci | Nov. 21, 1961 |
| 3,015,543 | Frey | Jan. 2, 1962 |
| 3,046,096 | Heller et al. | July 24, 1962 |